(12) United States Patent
Oh

(10) Patent No.: US 7,367,544 B2
(45) Date of Patent: May 6, 2008

(54) APPARATUS AND METHOD FOR REPLACING EXISTING ACTUATOR ZONE VALVES IN AN HVAC SYSTEM WITH A BALL VALVE

(75) Inventor: Michael Hung-Sun Oh, Rockford, IL (US)

(73) Assignee: TAC, LLC, Loves Park, IL (US)

( * ) Notice: Subject to any disclaimer, the term of this patent is extended or adjusted under 35 U.S.C. 154(b) by 300 days.

(21) Appl. No.: 11/015,448

(22) Filed: Dec. 17, 2004

(65) Prior Publication Data

US 2006/0131533 A1 Jun. 22, 2006

(51) Int. Cl.
*F16K 5/06* (2006.01)
(52) U.S. Cl. .................. 251/208; 251/315.1
(58) Field of Classification Search ........ 251/208–209, 251/121, 315.01–315.1, 314
See application file for complete search history.

(56) References Cited

U.S. PATENT DOCUMENTS

| | | | | |
|---|---|---|---|---|
| 3,542,337 A | * | 11/1970 | Scaramucci | 251/209 |
| 3,762,682 A | * | 10/1973 | Franck | 251/209 |
| 3,880,191 A | * | 4/1975 | Baumann | 251/298 |
| 5,305,986 A | * | 4/1994 | Hunt | 251/209 |
| 5,324,008 A | * | 6/1994 | Bonetti | 251/315.16 |
| 5,937,890 A | * | 8/1999 | Marandi | 251/209 |
| 6,039,304 A | | 3/2000 | Carlson et al. | |
| 6,073,907 A | | 6/2000 | Schreiner, Jr. et al. | |
| 6,629,683 B2 | * | 10/2003 | Wang | 251/315.1 |
| 2001/0030309 A1 | | 10/2001 | Carlson et al. | |

FOREIGN PATENT DOCUMENTS

| | | |
|---|---|---|
| EP | 0 503 195 | 9/1992 |
| EP | 0 928 916 | 7/1999 |

* cited by examiner

*Primary Examiner*—John Bastianelli
(74) *Attorney, Agent, or Firm*—Reinhart Boerner Van Deuren P.C.

(57) ABSTRACT

An apparatus and method are provided for replacing existing actuator driven zone valves in an HVAC system, and particularly valves of the rubber paddle type having actuators providing less than 90 degrees of rotation, with a ball valve including a skewed seat bearing that blocks flow through the flowpath when a valve member of the ball valve is rotated through an angle of substantially less than 90 degrees from a fully open position of the valve at which a bore in the valve member is substantially fully aligned with the flowpath. The actuator from the existing zone valve being replaced may be used with the provided ball valve apparatus and method.

22 Claims, 8 Drawing Sheets

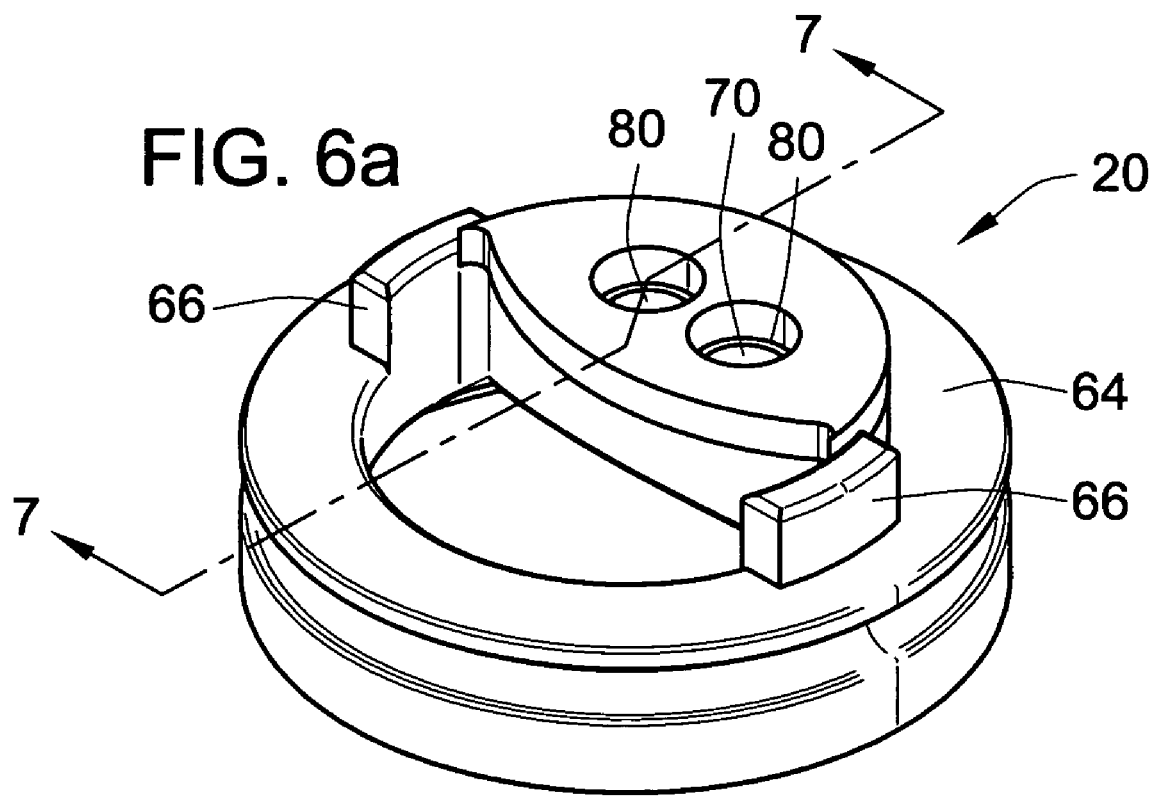
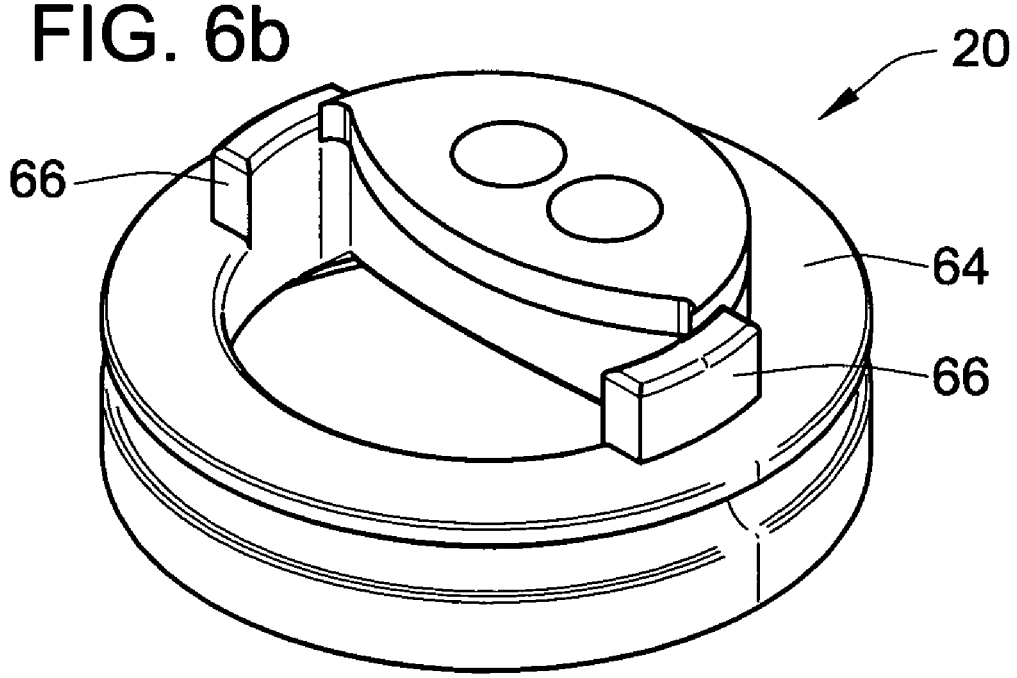

APPARATUS AND METHOD FOR REPLACING EXISTING ACTUATOR ZONE VALVES IN AN HVAC SYSTEM WITH A BALL VALVE

FIELD OF THE INVENTION

This invention relates to ball valves, and more particularly to an apparatus and method for using ball valves to replace existing actuator driven zone valves in an HVAC system, and specifically valves of the rubber paddle type having actuators providing less than 90 degrees of rotation, in such a manner that the actuator from the existing zone valve being replaced may be used with a ball valve according to the invention.

BACKGROUND OF THE INVENTION

Hydronic heating ventilating and air conditioning (HVAC) systems for buildings typically include a fluid circuit for delivering heated or chilled water, or other fluids, to occupied spaces in the building. The fluid circuit is typically divided into a number of zones, which can be connected or disconnected from the supply of heated or chilled fluid by zone valves. Such zone valves typically include electric motor driven actuators, which allow the zone valves to be opened or closed from a central location.

Rubber paddle type valves controlled by an electric motor driven actuator, are widely used as zone valves in HVAC systems. Rubber paddle valves typically include a valve body defining an internal passage having a valve seat, and a rubber paddle located within the internal passage that is movable in to, and out of, contact with the seat, for selectively blocking or allowing fluid flow through the internal passage. The rubber paddle is attached to a valve stem which extends through the valve housing for connection to the electric motor driven actuator. The electric motor driven actuator typically includes a return spring, for driving the rubber paddle back to a normally open or a normally closed position when the electric motor of the actuator is not energized.

As shown in FIG. 1, by virtue of their construction, rubber paddle valves typically require forty-five degrees or less of valve stem rotation to move the rubber paddle from a fully open position to a fully closed position, or vice versa. Actuators for use with rubber paddle type valves, are therefore typically designed to limit rotation of the valve stem to an angle of rotation of forty-five degrees or less, with angles of rotation in the range of thirty to forty-seven degrees being typical.

Commonly assigned U.S. Pat. No. 6,073,907 to Schreiner, et al., discloses electric motor driven, rubber paddle valves of the type described above. Schreiner also discloses a releasable engagement structure that provides for a snap-on attachment of the actuator to the body of a valve, and specifically to the body of a rubber paddle type valve.

Although rubber paddle type valves in general, and particularly electric motor driven valves of the type disclosed in Schreiner, work well as zone valves in HVAC systems, there are applications in which it is desirable to utilize a zone valve having higher reliability than can be practically achieved in a rubber paddle type valve.

In particular, it is desirable to use quarter-turn ball valves in zone valve application. Ball valves typically include a rotatable valve element that is formed from metal, or other materials which are more durable than the rubber paddles of the rubber paddle type valve. It is also highly desirable, in such applications, to be able to utilize the same electric motor driven, spring return actuators for driving the ball valves, that were used for driving the rubber paddle type valve.

Unfortunately, as illustrated in FIG. 1, the valve element of a ball valve must be rotated through ninety degrees to move from a fully open to a fully closed position. Spring-return actuators designed for use with rubber paddle valves typically only provide a maximum of forty-five degrees of rotation. If an actuator designed for use with a rubber paddle valve is used for driving a ball valve, the valve member of the ball valve will only be rotated through the first half, approximately, of the full 90 degree range of angular rotation provided by the ball valve.

As will be seen from FIG. 1, the flow through a ball valve is not a linear function of the angular position of the valve member. When the ball valve is initially opening, during the first half of its full 90 degree range of rotation, the slope of the curve depicting flow as a function of angular rotation is considerably flatter that the slope of the curve during the second half of the full 90 degree range of rotation. This results in the ball valve providing significantly less than half of its full flow capacity during the first half of its full 90 degree range of angular rotation, due to the inherent non-linear flow characteristics of the ball valve.

Modifying an existing spring return actuator, designed to provide forty-five degrees or less rotation to a rubber paddle type valve, so that it could provide 90 degrees of rotation and sufficient spring force to drive a ball valve through an angle of rotation of 90 degrees, is typically not possible. In a spring-return actuator, the electric motor must overcome not only the frictional and fluid forces resisting motion of the valve member, but must also work against the return spring. A return spring having enough torque to drive the valve member of a ball valve back to a normally open, or normally closed position, through a 90 degree angle of rotation, would need to be significantly larger than the spring used in an actuator operating over an angle of rotation of forty-five degrees or less. A combination of these factors would require that a spring return actuator capable of driving a ball valve through a full ninety degree angle of rotation would be significantly larger, heavier and more costly than the existing actuators used for driving rubber paddle type valves through an angle of rotation of forty-five degrees or less.

What is needed therefore is an improved apparatus and method for utilizing a ball valve as a zone valve in a HVAC system, preferably in a manner that allows for utilizing existing spring return actuators of the type used for providing forty-five degrees of rotation for rubber paddled type valves for driving the valve member of the ball valve.

In addressing this need, the inventor recognized that if a typical quarter-turn ball valve could be modified to operate over the second half of its angular rotation, i.e. from forty-five degrees to ninety degrees of full opening, existing actuators designed for use with prior rubber paddle type zone valves could be utilized to drive such a modified ball valve.

The inventor also recognized that, although a ball valve used in the second half of its range of angular rotation would typically need to have a higher flow coefficient than a paddle valve of a given size, the ball valve would not necessarily need to have a flow coefficient of twice the paddle valve, due to the steeper slope of the flow vs. angular position characteristic of a ball valve operating in the second half of its angular rotation. Specifically, the inventor recognized that a ball valve operating in the second half of its full 90 degree range of angular rotation would only typically need to be approximately 1.4 times as large as a paddle zone valve being replaced by the ball valve, in order to provide full on-off capability over a range of angular rotation of 45 degrees or less from a fully open position of the valve, because approximately 70 percent of the flow capacity of the ball valve is achieved in the second half of the 90 degree range of angular rotation of the ball valve. Conversely, if a ball valve having a full flow coefficient twice that of the paddle valve being replaced is used, the ball valve would provide significantly more full flow capacity than the paddle valve being replaced over the same angular rotation.

Because a ball valve having twice the full flow capacity of a given paddle type valve is also typically smaller in physical size than the paddle valve being replaced, the inventor further recognized that the need for using a ball valve having a somewhat larger rated capacity than the paddle valve being replaced, in practicing the invention, is not necessarily a disadvantage, and may provide significant advantage where it is desired to have increased full flow capability with the same actuator used with the paddle type zone valve being replaced.

BRIEF SUMMARY OF THE INVENTION

The invention provides an apparatus and method for replacing existing actuator driven zone valves in an HVAC system, and particularly valves of the rubber paddle type having actuators providing less than 90 degrees of rotation, with a ball valve including a skewed seat bearing that blocks flow through the flowpath when a valve member of the ball valve is rotated through an angle of substantially less than 90 degrees from a fully open position of the valve at which a bore in the valve member is substantially fully aligned with the flowpath. The actuator from the existing zone valve being replaced may be re-used with the provided ball valve apparatus and method.

In one form of the invention, a valve apparatus includes a ball valve having a valve housing, a valve member, and a skewed seat bearing. The housing defines a flowpath, in which the valve member is mounted for selective rotation about an axis of rotation. The valve member includes a through bore therein defining a fully open position of the ball valve when the valve member is rotated to substantially align the bore with the flowpath. The skewed seat bearing is disposed between the valve member and the valve housing, and extends partially across the flowpath, for sealing a juncture of the valve member with the valve housing, to thereby block fluid flow through the bore and define a closed position of the ball valve when the valve member is rotated away from the fully open position through an angle of rotation of substantially less than 90 degrees.

A valve apparatus, according to the invention, may further include an actuator operatively connected to the valve member for selectively rotating the valve member about the axis of rotation. The actuator may include an output, operatively connected to the valve member, and limited to impart a rotation to the valve member that is substantially equal to the angle of rotation.

The skewed seat bearing may be comprised of a polymer material, and may include a stiffener of a different material, such as metal or a different polymer. The skewed seat bearing may include a body thereof that is molded around the stiffener. The skewed seat bearing may be formed in a mold having alignment features for contacting the stiffener during molding, with the body of the skewed seat bearing including openings therein, after molding, whereby the stiffener is exposed after the removal skewed seat bearing from the mold.

A ball valve, according to the invention, may include a valve stem, operatively connected to the valve member, for rotating the valve member about the axis of rotation, with the valve stem including a distal end thereof having an alignment feature that is rotated from the bore about the axis of rotation by an angle equal to the angle of rotation. The valve member may include a slot therein extending perpendicular to the bore, for receipt of a first end of the valve stem, where the first end of the valve stem includes one or more flats for engaging the slot. The distal end of the valve stem may include one or more flats rotated from the flats (s) at the first end of the valve stem by an angle equal to the angle of rotation.

In another form of the invention, a method is provided for replacing an existing actuator driven zone valve with a valve apparatus including a ball valve having a valve housing, a valve member, and a skewed seat bearing, according to the invention. The method may further include attaching an actuator, to the ball valve, where the actuator includes an output that is operatively connected to the valve member and limited to impart a rotation the valve member that is substantially equal to the angle of rotation. A method, according to the invention, may also include removing the actuator from the existing zone valve, and operatively attaching the removed actuator to the ball valve. The method may further include adjusting limit settings of the actuator, to limit motion imparted to the valve member to substantially the angle of rotation. The method may yet further include configuring the ball valve to operate over an angle of rotation matching limit settings of the actuator.

Other aspects, objectives and advantages of the invention will be apparent from the following detailed description and the accompanying drawings.

BRIEF DESCRIPTION OF THE DRAWINGS

FIGS. 5a-5c, and FIGS. 6a-6b depict four alternate exemplary embodiments of a skewed seat bearing, according to the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
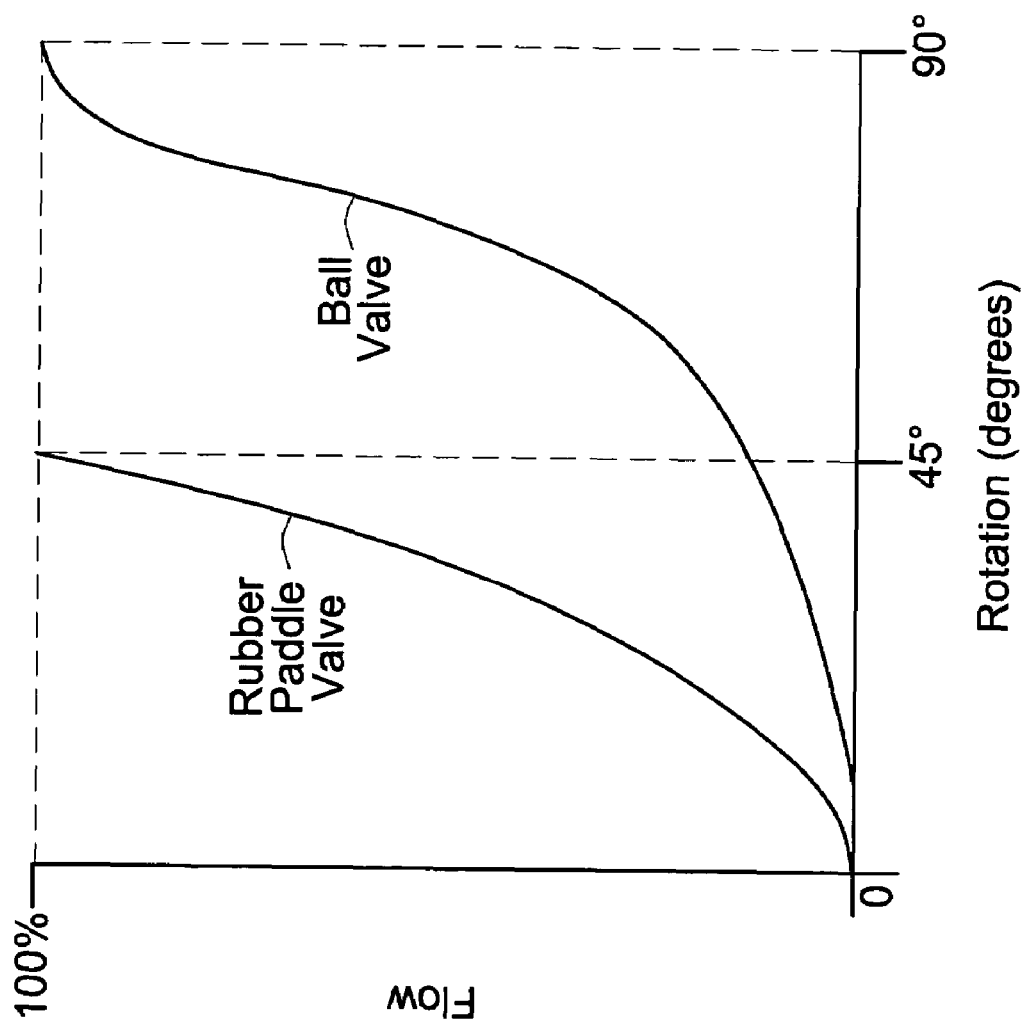
FIG. 1 is a graph showing flow through a prior rubber paddle-type valve, and a prior ball valve, as a function of an angular position of the valve member.
Figure 2:
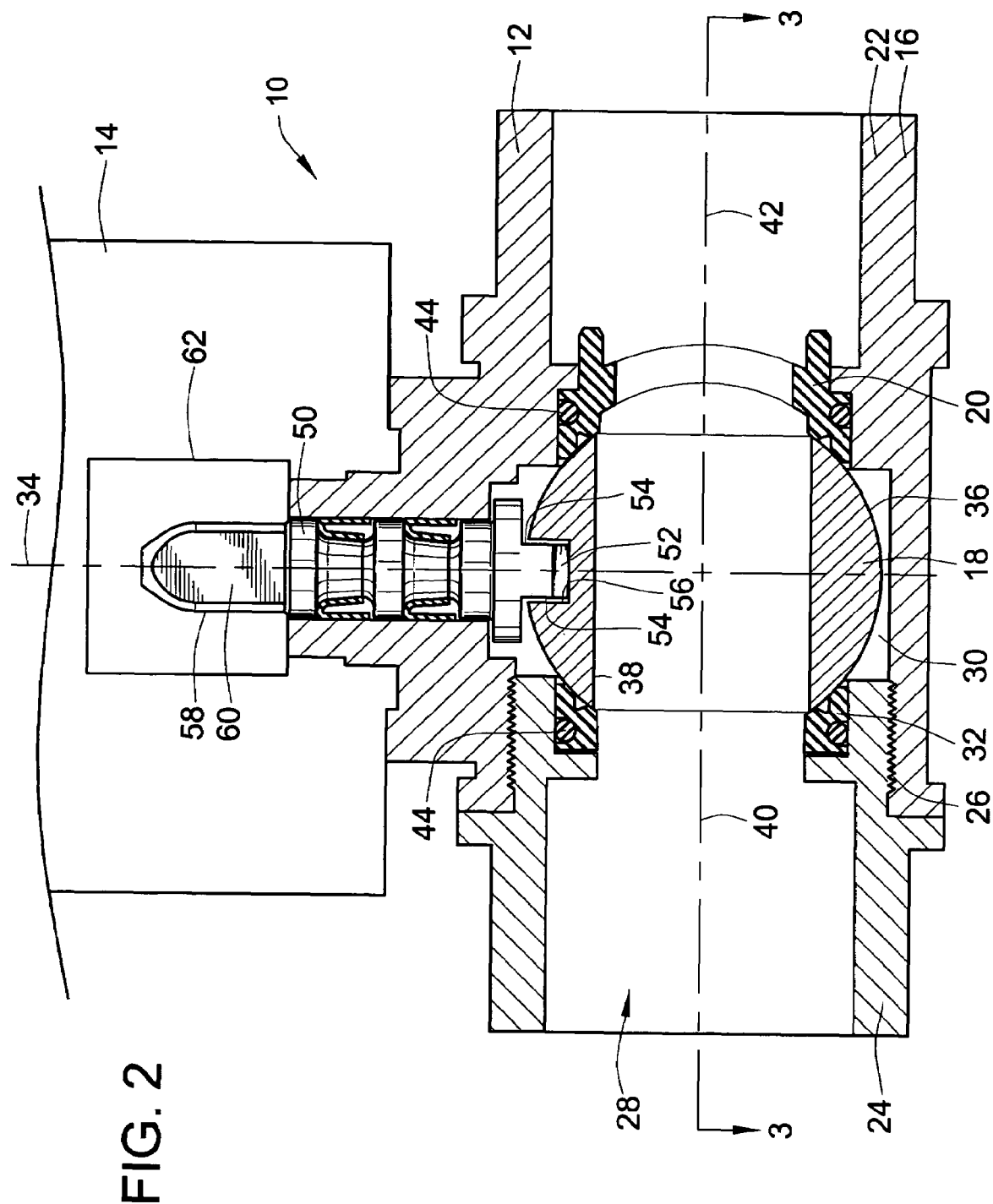
FIG. 2 is a longitudinal cross section through an exemplary embodiment of a valve apparatus according to the invention.

FIG. 2 shows a first exemplary embodiment of the invention, in the form of a valve apparatus 10 including a ball valve 12 and an actuator 14 operatively attached to the ball valve 12 in the manner described in more detail below. The ball valve 12 includes a valve housing 16, a valve member 18, and a skewed seat bearing 20. The valve housing 16 includes a first section 22 and a second section 24 which are joined by a threaded attachment 26 to define a flow path 28 extending through the housing 16 and a ball receiving cavity 30 within the flow path 28.

The valve member 18 of the exemplary embodiment is mounted between the skewed seat bearing 20 and a full port inlet bearing 32, within the ball receiving cavity 30, for selective rotation about an axis of rotation 34. The valve member of the exemplary embodiment is a generally spherically shaped ball having a substantially spherical outer surface 36. A through bore 38 extends through the valve member 18 to provide a fully open position of the ball valve 12 when the valve member 18 is rotated to the position illustrated in FIG. 2, with a center line 40 of the bore 38 substantially aligned with a longitudinal center line 42 of the flow path 28.

The skewed seat bearing 20 and the full port inlet bearing 32 are disposed in the flow path between the valve member 18 and the valve housing 16, and are sealingly attached to the valve housing 16 by a pair of O-ring seals 44.

Figure 3:
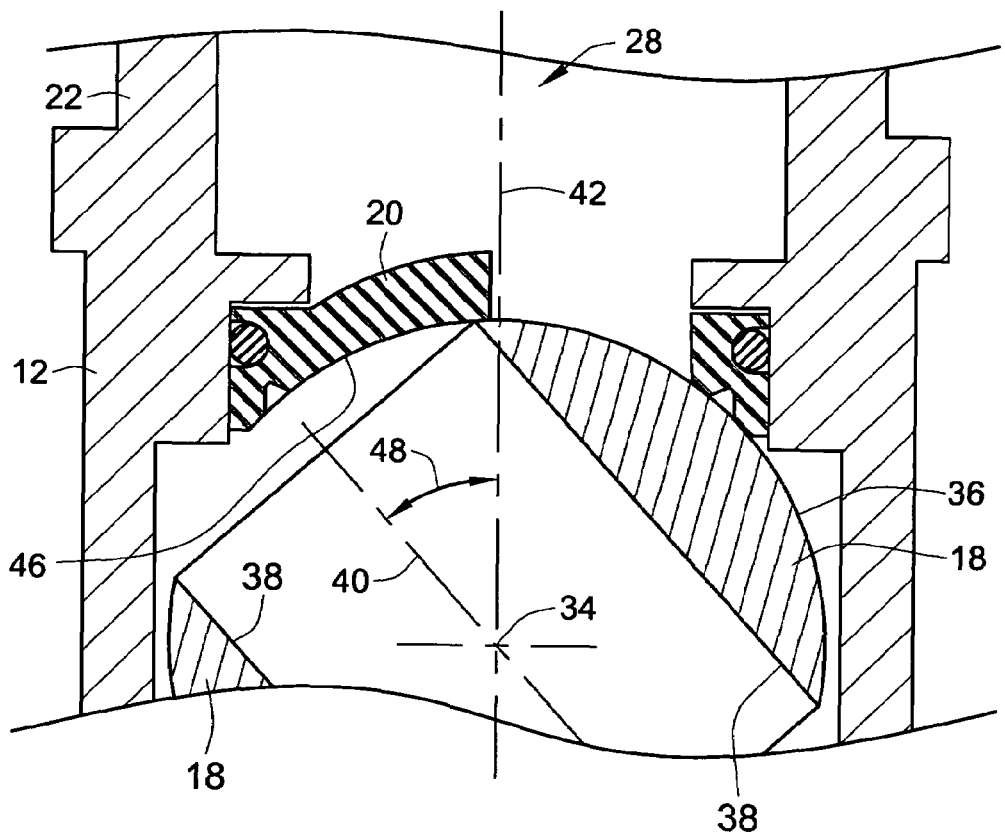
FIG. 3 is a horizontal cross section taken along the longitudinal axis of the valve apparatus of FIG. 1, as indicated in FIG. 2 by section lines 3-3, showing a valve member of the valve apparatus in a fully closed position.
Figure 4:
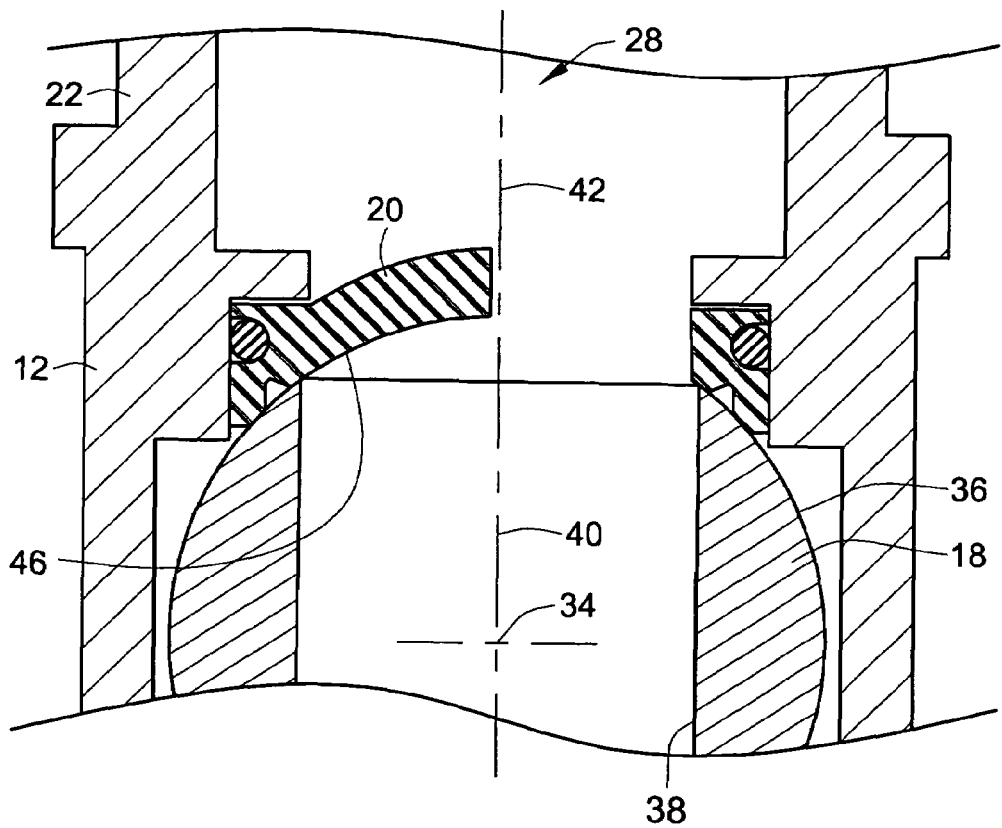
FIG. 4 is identical to the cross section of FIG. 3, except that the valve member is shown in a fully open position.

As shown in FIGS. 3 and 4, the skewed seat bearing 20 includes a spherical surface 46 thereof, extending partially across the flow path 28, and configured for closely conforming to the spherical outer surface 36 of the valve member 18, for sealing a juncture of the valve member 18 with the skewed seat bearing 20, to thereby block fluid flow through the bore 38 in the valve member 18 at a fully closed position of the ball valve 12 as illustrated in FIG. 3, when the valve member 18 is rotated through an angle of rotation 48 that is substantially less than 90 degrees away from a fully open position, as shown in FIG. 4, to a fully closed position of the valve 12 as shown in FIG. 3. As will be appreciated by comparing the fully closed position shown in FIG. 3 with the fully open position shown in FIG. 4, the angle of rotation 48 of the exemplary embodiment can be made substantially equal to, or less than, forty-five degrees, to match the angle of rotation provided by actuators of the type previously used for driving rubber paddle type valves. It will be further appreciated, that the angle of rotation 48 provided by a skewed seat bearing 20, according to the invention, may be adjusted during the design of the skewed seat bearing through the selection of the extent to which the spherical surface 46 of the skewed seat bearing extends across the flow path 28.

As shown in FIG. 2, the ball valve 12 also includes a valve stem 50 having a first end 52 thereof including a pair of flats 54 configured for engaging side walls of a complimentary slot 56 in the valve member 18. As best seen in FIG. 2, the flats 54 on the first end 52 of the valve stem 50, and the sidewalls of the slot 56 in the valve member 18, extend perpendicularly to the center line 40 of the bore 38 in the valve member 18. The distal end 58 of the valve stem 50 (i.e. the upper end, as shown in FIG. 2) also includes a pair of flats 60, which are oriented perpendicular to the flats 54 on the first end 52 of the valve stem 50. By virtue of this orientation of the flats 54, 60 on the first and distal ends, 52, 58 of the valve stem 50, the flats 60 on the exposed distal end 58 of the valve stem 50 extend parallel to both the center line 40 of the bore 48 and the longitudinal axis 42 of the flow path 28 when the valve member 18 is rotated to the fully open position shown in FIG. 4, and when the valve member 18 is rotated through the angle of rotation 48 to the fully closed position shown in FIG. 3, the flats 60 on the distal end 58 of the valve stem 50 will be orientated at an oblique angle to the longitudinal center line 42 of the flow path equal to the angle of rotation 48. The flats 60 on the distal end 58 of the valve stem 50 therefore provide therefore provide an externally visible alignment feature indicating the orientation of the through bore 38 with respect to the longitudinal center line 42 of the flow path 28.

As shown in FIG. 2, the actuator 14, of the exemplary embodiment of the valve apparatus 10, includes an output 62 which is operatively connected to the valve member 18 through the valve stem 50, to in part a rotation to the valve member 18, about the axis of rotation 34, that is substantially equal to the angle of rotation 48. It is preferred that the actuator 14 include means, such as are known in the art, for limiting the rotation of the output 62 of the actuator 14 in such a manner that the output 62 can only drive the valve member 18 through an angle equal to the angle of rotation 48 between the fully open and fully closed positions of the ball valve 12. Limitation of the angle of rotation provided by the actuator 14 may be provided, for example, by limit switches or stops within the actuator 14. In actuators, such as those described in commonly assigned U.S. Pat. No. 6,073,907 to Schreiner, et al., the disclosure of which is incorporated herein by reference, the configuration of a internal sector gear and pinion drive can be selected to provide a desired limitation on the angle of rotation that can be provided by the output 62 of the actuator 14.

Figure 5A:
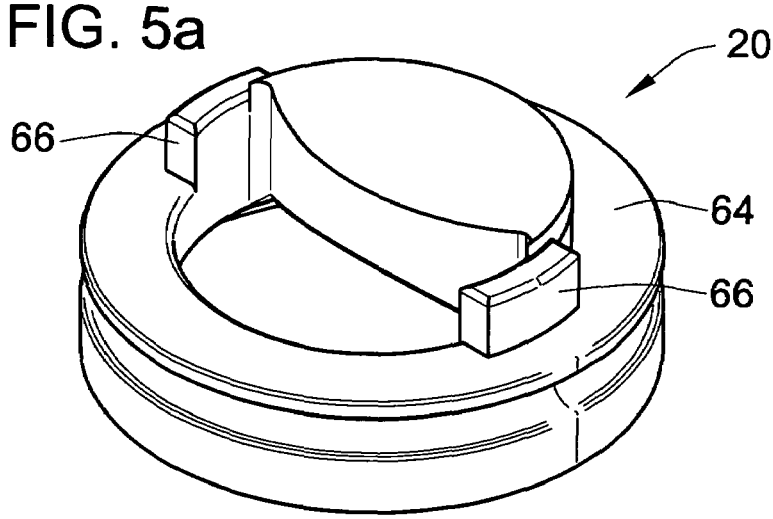
Figure 5B:
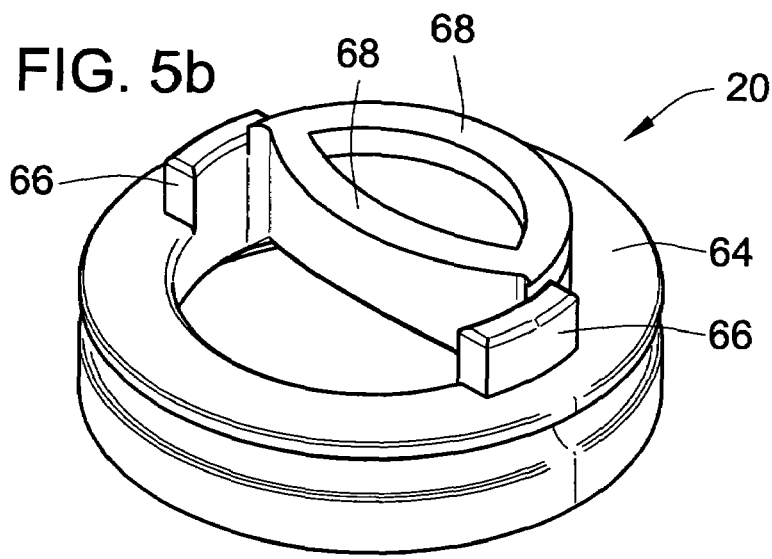
Figure 5C:
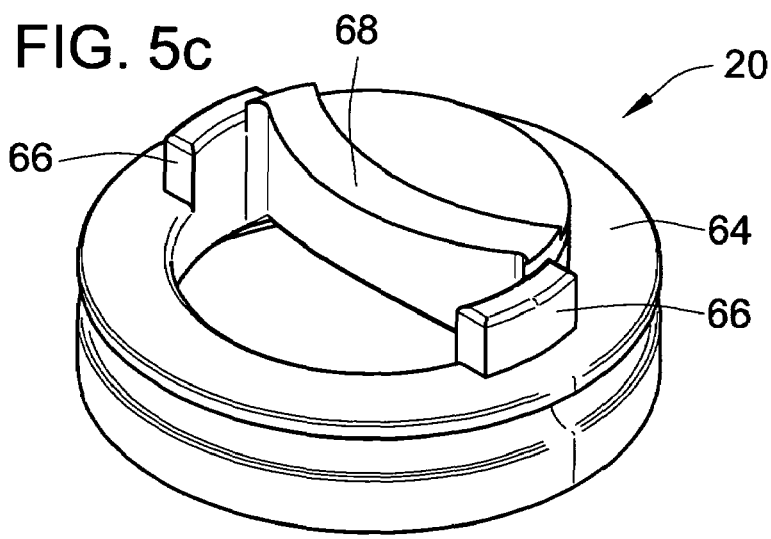

FIGS. 5A-5C illustrate alternate embodiments of a skewed seat bearing 20, according to the invention. FIGS. 6A and 6B illustrate yet another alternate embodiment of a skewed seat bearing 20 according to the invention. Although a skewed seat bearing 20 according to the invention can be formed from any suitable metallic or non-metallic it is contemplated that a filled polymer material, such as 25-45% carbon filled Virgin Teflon will be preferred in practicing the invention. Such a material provides sufficient strength to withstand the fluid forces imparted against the skewed seat bearing 20, while still providing a good seal between the skewed seat bearing 20 and the outer surface 36 of the valve member 18. Such a material also provides good lubricity between the valve member 18 and the skewed seat bearing 20, to help reduce the torque required from the actuator 14 for driving the valve member between the fully open and fully closed positions of the ball valve 12. It is also preferable in practicing the invention to use a chrome plated brass ball in conjunction with a skewed seat bearing of filled polymer material.

FIGS. 5a-5c, and FIGS. 6a-6b, show exemplary embodiments of skewed seat bearings, according to the invention. A skewed seat bearing 20, according to the invention, generally is comprised of a unitary body 64 which may be formed by molding or other known methods, to provide features such as mounting tabs 66, for orientating and retaining the skewed seat bearing 20 within the valve housing 16, and reinforcing ribs 68 as shown in FIGS. 5B and 5C. Where a polymer material is used for forming the skewed seat bearing 20, the mounting tabs 66 may be heat staked or adhesively joined to the valve housing 16. Whether reinforcing ribs 68 are required or not, can be determined by such valve operating parameters as the operating pressure and the allowable leakage through the ball valve 12. For low operating pressures, or where a small amount of leakage caused by the deflection of the spherical surface 46 of the skewed seat bearing 20 away from the spherical outer surface 36 of the valve member 18 is not objectionable, a skewed seat bearing 20 embodiment not having ribs, such as the ones shown in FIG. 5a, may be sufficient. Where operating pressures are some what higher, and where leakage must be more closely controlled, configurations of the skewed seat bearing 20, such as those shown in FIGS. 5b and 5c having one or more reinforcing ribs 68 may be required to achieve a desired performance of a ball valve 12 according to the invention.

Figure 7:
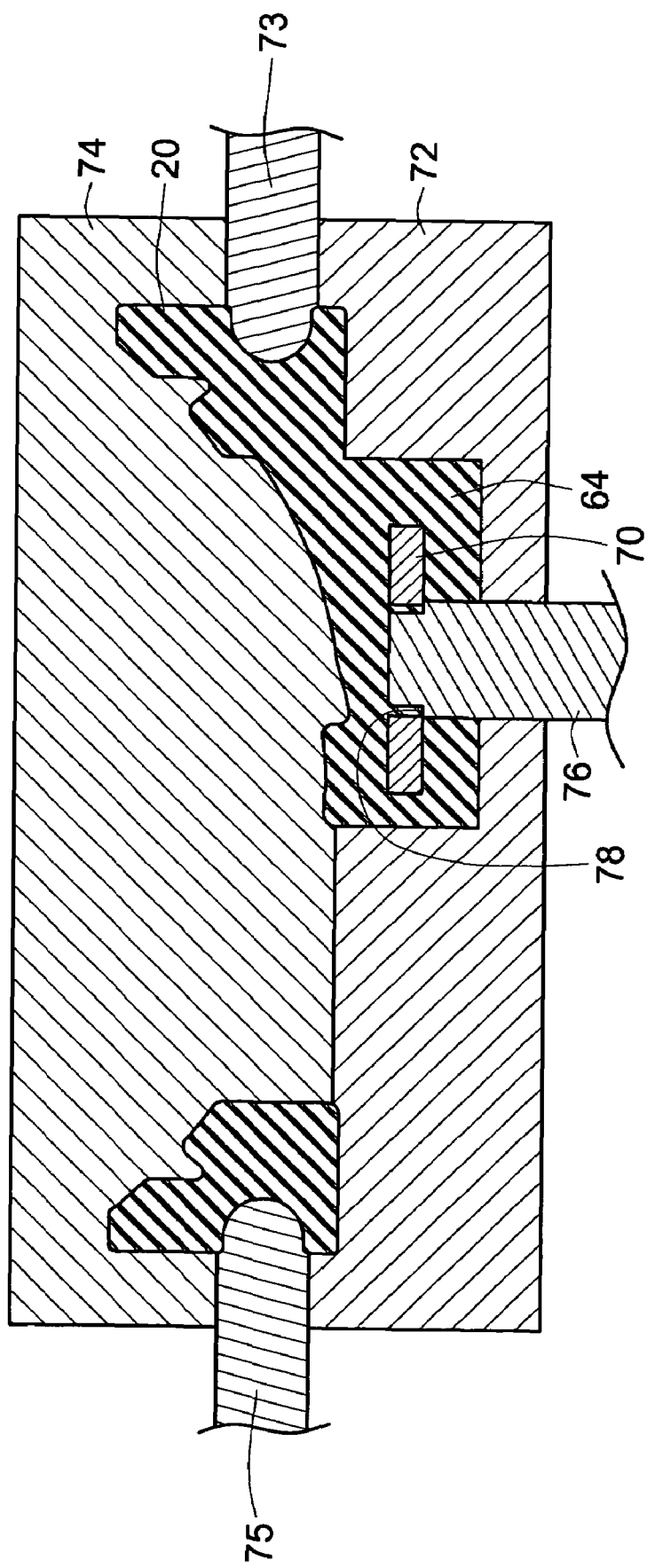
FIG. 7 is a schematic illustration of tooling utilized for molding the exemplary embodiment of the skewed seat bearing showed in FIGS. 6a-6b.

For high operating pressures, or where achieving zero leakage is critical, it may be desirable to provide a skewed seat bearing 20 including a stiffener 70 of a material different from the material used for forming the body 64 of the charactering bearing 20, as shown in the embodiments of FIGS. 6a and 6b. The stiffener 70 may be formed from a variety of materials including metal, or a composite material having a stiffness greater than the material used for forming the body 64 of the skewed seat bearing 20. In the embodiment depicted in FIG. 6a and FIG. 6b, the body 64 of the skewed seat bearing 20 is molded around the stiffener 70. As shown in FIG. 7, a skewed seat bearing 20, having an insert 70 molded within a body 64, such as the embodiments shown in FIG. 6a and FIG. 6b may be formed in a mold 72, 73, 74, 75 having alignment features 76 for contacting the stiffener 70 during molding. In some embodiments, such as those depicted in FIG. 6a and FIG. 6b, the body 64 of the skewed seat bearing 20 may include openings 80 therein formed by the alignment features 76 of the mold 72, 73, 74, 75 after molding, whereby the stiffener 70 is exposed after removal of the skewed seat bearing 20 from the mold, 72, 73, 74, 75.

The invention may also be practiced in the form of a method for replacing an existing actuator driven zone valve with a valve apparatus including a ball valve having a valve housing, a valve member, and skewed seat bearing, according to the invention, such as the valve apparatus 10 of the exemplary embodiment described above. The method may further include attaching an actuator 14 to the ball valve 12, where the actuator 14 includes an output 62 that is operatively connected to the valve member 18 by a valve stem 50, with the output 62 being limited to impart a rotation to the valve member 18 that is substantially equal to the angle of rotation 48. A method, according to the invention may also provide the option of removing an actuator from an existing zone valve, which is being replaced by a ball valve according to the invention, and operatively attaching the removed actuator to the ball valve.

Figure 8:
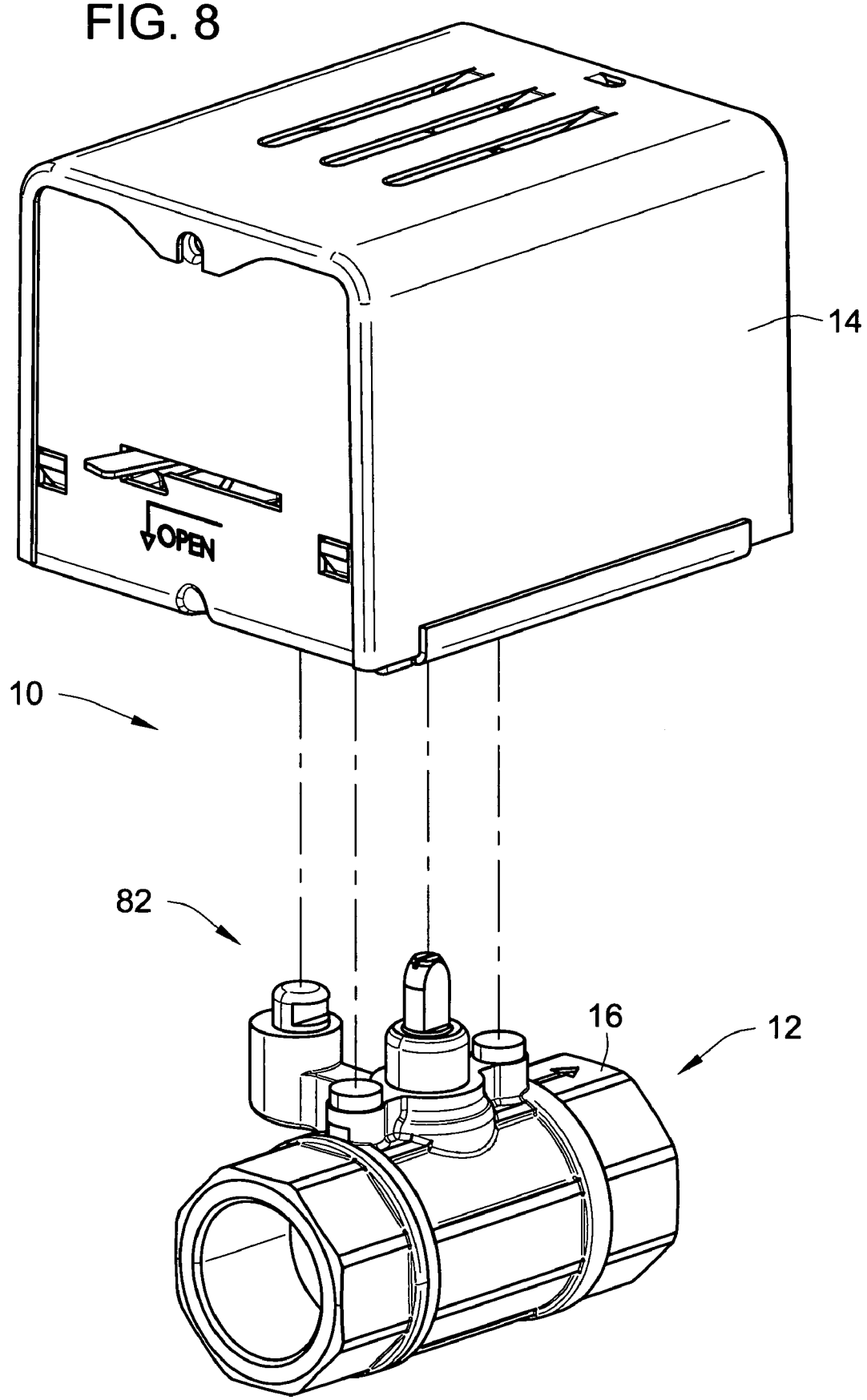
FIG. 8 is a perspective illustration of a valve apparatus, according to the invention, including a releasable engagement structure that provides for snap-on attachment of an actuator to a valve housing.

As shown in FIG. 8, in some embodiments of the invention, the ball valve 12 may include a releasable engagement structure 82 that provides for snap-on attachment of an actuator 14 to the valve housing 16 in the manner disclosed in the commonly assigned U.S. Pat. No. 6,073,907 to Schreiner, et al. as referenced above.

Figure 9:
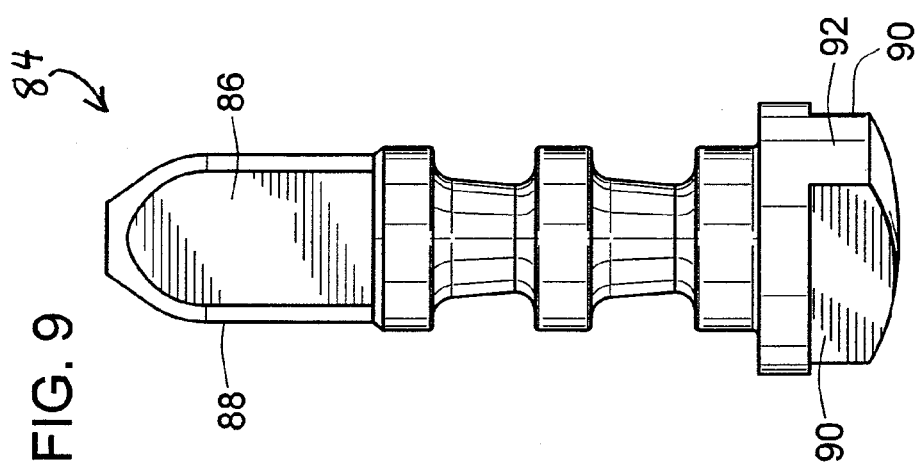
FIG. 9 shows an embodiment of a special valve stem, according to the invention.
Figure 10:
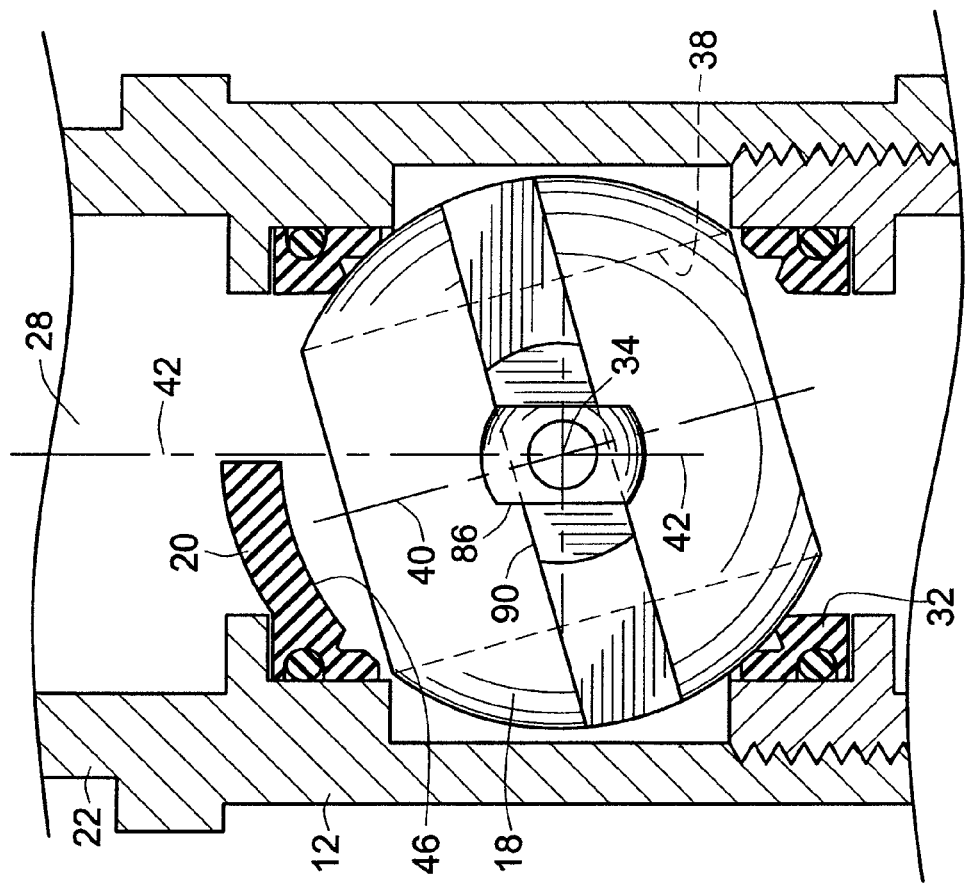
FIG. 10 is a horizontal cross section, similar to the cross section shown in FIGS. 3 and 4, showing the special valve stem of FIG. 9 indicating that the valve in FIG. 10 is in a fully open position.

A method, according to the invention may further include adjusting limit settings of the actuator 14 to limit motion imparted to the valve member 18 to substantially the angle of rotation 48. In addition to the methods for adjusting the limits of actuator rotation described above, a ball valve 12 in accordance with the invention may also include a special valve stem 84, as shown in FIG. 9, having flats 86 at a distal end 88 of the valve stem 84, which are positioned at an angle of less than 90 degrees from the flats 90 at a first end 92 of the valve stem 84. As shown in FIG. 10, by virtue of having the flats 86 at the distal end 84 of the valve stem 84 disposed at an angle less of than 90 degrees from the flats 90 at the first end 92 of the valve stem 84, when the flats 86 at the distal end 88 of the valve stem 84 are orientated parallel to the longitudinal center line 42 of the flow path 28, to thereby signify a fully open position of the ball valve 12, in accordance with established industry standards, the through bore 38 and the valve member 18 will still not be fully aligned with the flow path 28 to thereby further limit the full flow capacity of the ball valve 12 to a desired maximum value.

Those having skill in the art will also recognize that, although invention has been described herein with reference to several exemplary embodiments, many other embodiments of the invention are possible. For example, the skewed seat bearing may be configured as more than one part including a bearing portion and a flow restricting portion. The alignment features at the ends of the valve stem may also take a number of forms other than the double-D flat arrangement disclosed above in regard to the exemplary embodiments. The valve member, and other embodiments of the invention, need not be a spherical ball, but may take any other form, such as cylindrical or conical, as is know in the art of ball valves.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve apparatus comprising, a ball valve having a valve housing, a valve member, and a skewed seat bearing, the housing defining a flowpath, the valve member being mounted in the flowpath for selective rotation about an axis of rotation and having a cylindrical through bore of substantially constant diameter therein having a first end and a second end thereof, the bore defining a fully open position of the ball valve when the valve member is rotated to substantially align the bore with the flowpath, the skewed seat bearing being disposed between the first end of the bore of the valve member and the valve housing and extending partially across the flowpath for blocking fluid flow through the bore and defining a closed position of the ball valve when the valve member is rotated away from the fully open position through an angle of rotation of substantially less than 90 degrees, the second end of the bore being open to the flowpath when in the closed position, the skewed seat bearing having a spherical surface configured to provide a flow characteristic approximating that of a paddle valve wherein full on-off flow capability is provided over the angle of rotation.

2. The valve apparatus of claim 1, wherein the angle of rotation is substantially equal to or less than 45 degrees.

3. The valve apparatus of claim 1, further comprising an actuator operatively connected to the valve member for selectively rotating the valve member about the axis of rotation.

4. The valve apparatus of claim 1, wherein the skewed seat bearing is comprised of a polymer material.

5. The valve apparatus of claim 4, wherein the skewed seat bearing includes a stiffener of a different material.

6. The valve apparatus of claim 5, wherein the stiffener is formed from a metal material.

7. The valve apparatus of claim 5, wherein the skewed seat bearing includes a body thereof that is molded around the stiffener.

8. The valve apparatus of claim 7 wherein the skewed seat bearing is formed in a mold having alignment features for contacting the stiffener during molding, and the body of the skewed seat bearing includes openings therein, after molding, through which a portion of the stiffener is exposed after removal of the skewed seat bearing from the mold.

9. The valve apparatus of claim 1, wherein the ball valve includes a valve stem operatively connected to the valve member, for rotating the valve member about the axis of rotation, and the valve stem includes a distal end thereof having an alignment feature that is rotated from being parallel to a centerline of the bore about the axis of rotation by a first angle.

10. The valve apparatus of claim 9, wherein the valve member includes a slot therein extending perpendicular to the centerline of the bore, for receipt of a first end of the valve stem, the first end of the valve stem includes one or more flats for engaging the slot, and the distal end of the valve stem includes one or more flats rotated from the flat(s) at the first end of the valve stem by an angle equal to ninety degrees minus the first angle.

11. A method for replacing an existing actuator driven paddle zone valve, the method comprising, replacing the existing paddle zone valve with a ball valve apparatus including, a ball valve having a valve housing, a valve member, and a skewed seat bearing, the housing defining a flowpath, the valve member being mounted in the flowpath for selective rotation about an axis of rotation and having a cylindrical through bore of substantially constant diameter therein having a first end and a second end thereof, the bore defining a fully open position of the ball valve when the valve member is rotated to substantially align the bore with the flowpath, the skewed seat bearing being disposed between the first end of the bore of the valve member and the valve housing, and extending partially across the flowpath, for blocking fluid flow through the bore and defining a fully closed position of the ball valve when the valve member is rotated away from the fully open position through an angle of rotation of substantially less than 90 degrees, the second end of the bore being open to the flowpath when in the closed position, the skewed seat bearing having a spherical surface configured to provide a flow characteristic approximating that of the existing paddle zone valve wherein the ball valve transitions between the fully open position and the fully closed position over the angle of rotation.

12. The method of claim 11, further comprising, removing the actuator from the existing paddle zone valve, and operatively attaching the removed actuator to the ball valve.

13. A valve apparatus comprising:
a ball valve having a valve housing, a valve member, and a skewed seat bearing, with the housing defining a flowpath;
the valve member being mounted in the flowpath for selective rotation about an axis of rotation and having a cylindrical through bore having a substantially constant diameter therein having a first end and a second end thereof, the bore defining a fully open position of the ball valve when the valve member is rotated to substantially align the bore with the flowpath;
the skewed seat bearing being disposed between the first end of the bore of the valve member and the valve housing and extending partially across the flowpath, for blocking fluid flow through the bore and defining a closed position of the ball valve when the valve member is rotated away from the fully open position through an angle of rotation of substantially less than 90 degrees, the second end of the bore being in communication with the flowpath when in the closed position, the skewed seat bearing having a spherical surface configured to provide a flow characteristic approximating that of a paddle zone valve wherein the fluid flow transitions from zero to one hundred percent flow over the angle of rotation.

14. The valve apparatus of claim 13, wherein the angle of rotation is substantially equal to or less than 45 degrees.

15. The valve apparatus of claim 13, further comprising an actuator operatively connected to the valve member for selectively rotating the valve member about the axis of rotation.

16. The valve apparatus of claim 13, wherein the skewed seat bearing is comprised of a polymer material.

17. The valve apparatus of claim 16, wherein the skewed seat bearing includes a stiffener of a different material.

18. The valve apparatus of claim 17, wherein the stiffener is formed from a metal material.

19. The valve apparatus of claim 17, wherein the skewed seat bearing includes a body thereof that is molded around the stiffener.

20. The valve apparatus of claim 19 wherein the skewed seat bearing is formed in a mold having alignment features for contacting the stiffener during molding, and the body of the skewed seat bearing includes openings therein, after molding, through which a portion of the stiffener is exposed after removal of the skewed seat bearing from the mold.

21. The valve apparatus of claim 13, wherein the ball valve includes a valve stem operatively connected to the valve member, for rotating the valve member about the axis of rotation, and the valve stem includes a distal end thereof having an alignment feature that is rotated from being parallel to a centerline of the bore about the axis of rotation by a first angle.

22. The valve apparatus of claim 21, wherein the valve member includes a slot therein extending perpendicular to the centerline of the bore, for receipt of a first end of the valve stem, the first end of the valve stem includes one or more flats for engaging the slot, and the distal end of the valve stem includes one or more flats rotated from the flat(s) at the first end of the valve stem by an angle equal to ninety degrees minus the first angle.

* * * * *